United States Patent [19]

Schutt

[11] Patent Number: 4,959,177
[45] Date of Patent: Sep. 25, 1990

[54] REDUCING STRESS CORROSION CRACKING IN TREATING GASES WITH ALKANOL AMINES

[75] Inventor: Hans U. Schutt, Houston, Tex.

[73] Assignee: Shell Oil Company, Houston, Tex.

[21] Appl. No.: 395,202

[22] Filed: Aug. 16, 1989

Related U.S. Application Data

[63] Continuation of Ser. No. 106,824, Oct. 9, 1987, abandoned.

[51] Int. Cl.$^5$ .............................................. C23F 11/10
[52] U.S. Cl. ...................................... 252/391; 252/392
[58] Field of Search ............. 252/391 APS, 392 APS, 252/391, 392

[56] References Cited

U.S. PATENT DOCUMENTS

| | | | |
|---|---|---|---|
| 3,904,537 | 9/1975 | Ripple | 252/391 X |
| 4,071,470 | 1/1978 | Davidson et al. | 252/389.53 X |
| 4,088,735 | 5/1978 | Bratzler et al. | 423/219 |
| 4,096,085 | 6/1978 | Holoman et al. | 252/189 |
| 4,100,100 | 7/1978 | Clouse et al. | 252/389.53 |
| 4,102,804 | 7/1978 | Clouse et al. | 252/391 X |
| 4,295,979 | 10/1981 | Sharp et l. | 252/391 X |
| 4,350,600 | 9/1982 | Sharp et al. | 252/391 X |
| 4,431,563 | 2/1984 | Krawczyk et al. | 252/189 |

Primary Examiner—John S. Maples
Assistant Examiner—Valerie Denise Fee

[57] ABSTRACT

Stress corrosion cracking of metal weldments in the presence of an aqueous alkanol amine solution is reduced by the use of a stress corrosion inhibiting amount of a sulfiding agent selected from elemental sulfur or a sulfide ion yielding compound.

18 Claims, No Drawings

REDUCING STRESS CORROSION CRACKING IN TREATING GASES WITH ALKANOL AMINES

This is a continuation of application Ser. No. 106,824, filed Oct. 9, 1987, now abandoned.

FIELD OF THE INVENTION

The present invention relates to a process for reducing stress corrosion cracking of metal weldments in contact with contaminated alkanol amine solutions, e.g., solvents for treating gases.

BACKGROUND OF THE INVENTION

General surface corrosion of metals by chemicals dissolved in an electrolyte is a common problem in the operation of industrial processes which utilize amines or alkanol amines as reactants, products, solvents or the like and is treated in a variety of ways. For example, U.S. Pat. No. 4,071,470 discloses a method of inhibiting the corrosion of metals in contact with an acid-gas absorbing medium by use of the reaction product of (1) certain copper materials, and (2) sulfur or a sulfide and an oxidizing agent, and (3) a monoalkanol amine prepared under anhydrous conditions. U.S. Pat. No. 4,096,085 discloses an aqueous organic amine acid gas scrubbing system having incorporated therein (1) certain amines, (2) a copper material, and (3) sulfur or a sulfur yielding compound. U.S. Pat. No. 4,088,735 discloses the purification of gases from the gasification of fossil fuels in three scrubbing stages in which the second stage uses a high-boiling organic solvent which is miscible with water (e.g., pyrrolidones, polyglycol ethers, tetrahydrothiophene-1,1-dioxide, butyrolactone, morpholine and N-methyl-epsilon-caprolactam and equivalent kinds of solvents) and to which sulfur has been added to promote the removal of methyl mercaptan by forming higher boiling disulfides.

Generally, stress corrosion cracking of metal weldments is a different problem than the above-described general corrosion of metal surfaces and involves the accelerated localized corrosion of a metal under a continuing stress in which the effects are greater than those of either the corrosive environment or the stress alone. The higher the strength of a given material, the greater its tendency for stress corrosion cracking and highly alloyed materials generally exhibit greater susceptibility toward this type of attack. A period of "initiation" is required in which localized corrosion occurs that may take the form of pits or notches. Cracking initiation follows the induction period if conditions are appropriate for inducing cracking. As a metal yields to corrosion, the surface of the metal is broken up preventing the formation of a protective oxide or sulfide film and thereby presenting a continued supply of unprotected metal to the corrosive environment. Thus, stress corrosion cracking is not the same as common corrosion and occurs in situation of low general corrosion but results in deep cracking of the metal often in the heat affected zone of the weldments.

Metal stress, where stress corrosion cracking can occur, is introduced into metal weldments by the very nature of the welding process in which the heat of welding causes the localized properties of the metal around the weld to be changed from the remainder of the metal in the equipment. One way of reducing stress corrosion cracking of equipment having metal weldments is to subject the equipment after welding to a stress-relieving treatment in which the entire piece of equipment is heated to provide a uniform metal structure. However, this stress-relieving treatment is expensive and time-consuming. Thus, equipment in gas treating units can often be made of non-stress relieved metal weldments.

Although alkanol amine treating facilities have been used for hydrogen sulfide and/or carbon dioxide acid gas removal since the early 1950's, stress corrosion cracking of metal weldments in these units was not a major concern until recently when application of the wet fluorescent magnetic particle technique revealed extensive cracking problems in equipment. A National Association of Corrosion Engineer's (NACE) survey in 1985/1986 confirmed that the amine stress corrosion cracking of metal weldments represented by tight, branched, primarily intergranular cracks is a relatively common failure mode in non-stress relieved carbon steel equipment in monoethanol amine plants and, to a lesser degree, in diethanol amine or methyldiethanol amine gas treating facilities. Temperatures at which this type of cracking has been observed cover the entire range encountered in alkanol amine acid gas treating plants, namely from about 100° F. to about 250° F.

Applicant has discovered that stress corrosion cracking of metal weldments in the presence of alkanol amines proceeds by a novel mechanism caused by a combination of carbon dioxide, carbonates, certain weak sulfiding agents (e.g., sulfur containing salt compounds), cyanides and chlorides present as contaminants in the aqueous alkanol amine solution. The following mechanism is proposed: The carbonats in solution form a protective carbonate/magnetite film on the metal surface, whose potential is shifted into the cracking range by carbon dioxide in the atmosphere. The integrity of the carbonate film is affected by sulfide inclusions which form in the presence of weak sulfiding agents, such as thiosulfate ions. Contamination by chloride and/or cyanide appear to rupture the magnetite/sulfide film locally so that stress corrosion cracking can proceed. The alkanol amine solvent solution is believed to only provide the appropriate pH and, thus, the proper carbonate/bicarbonate ratio for stress corrosion cracking to occur. Standard slow strain rate tensile test results indicate that failures in alkanol amine stress corrosion cracking of metal weldments are induced by exposure of non-stress relieved carbon steel to an alkanol amine solvent solution of complex composition due to the above described contaminants. Cracking proceeds basically in two stages. Conspicuous, blunt cracks—better described as fissures—first form caused by the activity of carbon dioxide and carbonates in alkanol amine solvents and may be classified as carbonate/bicarbonate type cracks. In the second stage, cracks, propagating in an intergranular mode, originate at the bottom of the blunt fissures caused by weak concentrations of sulfiding impurities (e.g., sulfur containing salt compounds) in the presence of chloride and/or cyanide. Stress cracking patterns developing in the standard slow strain rate tensile test metal specimens exposed to fresh alkanol amine solvent solution with the above contaminant components added are quite similar to those in metal specimens exposed to carbon dioxide saturated, lean alkanol amine plant solvent. When the weak concentrations of sulfiding salt compounds are absent, fissuring merges into general corrosion at high alkanol amine concentrations (about 50%). In the presence of weak concentrations of sulfiding sulfur containing salt compounds, but in the absence of chloride, cracks become relatively shallow, blunt and primarily transgranular. However, in the presence of both weak concentrations of sulfiding salt (thiocyanate) compounds and chloride, cracking is primarily intergranular (characteristic of stress corrosion cracking of metal weldments) in solvent solutions containing 15% and 25% monoethanol amine and strictly transgranular in the 50% monoethanol amine solvents.

Accordingly, it is desirable to reduce or prevent the stress corrosion cracking of metal weldments of industrial equipment which comes in contact with corrosive chemicals, such as contaminated alkanol amine reactants, products and solvents.

SUMMARY OF THE INVENTION

The present invention is directed to a process for reducing the stress corrosion cracking of metal weldments in the presence of an aqueous solution of an alkanol amine which comprises adding to the aqueous alkanol amine solution a stress corrosion cracking reducing amount of a sulfiding agent selected from elemental sulfur or a sulfide ion yielding compound.

The addition of elemental sulfur or sulfide ion yielding compounds of the invention to the alkanol amine solution is effective to protect equipment which comes in contact with such contaminated alkanol amine solution, by reducing (preventing) stress corrosion cracking of metal weldments. The elemental sulfur or sulfide ion yielding compounds will remain in solution as long as the alkanol amine solution is in contact with metal weldments, i.e., also in the stripping and lean solvent section of an alkanol amine plant.

Thus, the present invention is also directed to a novel compositions comprising an aqueous solution of an alkanol amine and a stress corrosion cracking reducing amount of a sulfiding agent selected from elemental sulfur or a sulfide ion yielding compound.

In another embodiment, the present invention is directed to a process for treating a gas stream containing hydrogen sulfide or carbon dioxide with a solvent comprising an aqueous solution of an alkanol amine containing a stress corrosion cracking reducing amount of a sulfiding agent selected from elemental sulfur or a sulfide ion yielding compound.

In the processes and compositions according to the present invention, the aqueous alkanol amine solution comprises any conventional alkanol amine known in the art which is subject to stress corrosion cracking conditions because of the potential presence of the combination of carbon dioxide, carbonate, certain soluble weak concentrations of sulfiding sulfur containing salt compounds, and chlorides or cyanides. This includes primary, secondary and tertiary alkanol amines, which may contain substituents otherwise inert to the added sulfur or sulfide ion yielding compound of the invention. The alkanol amine includes N-alkylated derivatives thereof and can contain up to about 10 carbon atoms. For example, the alkanol amine is preferably a primary or secondary alkanol amine. Suitable alkanol amines include monoethanol amine (MEA) diethanol amine (DEA), methyldiethanol amine (MDEA), and the like. The aqueous solution usually contains from about 25% to about 50% alkanol amine although higher and lower concentrations are conventional and are contemplated by the present invention.

The aqueous alkanol amine solution can be in the form of a composition with other ingredients, such as a co-solvent. Suitable co-solvents include alkane diols, polyols, and ethers thereof, sulfones, sulfoxides, N-heterocyclics, carboxylic acid amides and other conventional gas treating solvents known in the art and useful for the removal of hydrogen sulfide and/or carbon dioxide. For example, the co-solvent is ethylene glycol, diethylene glycol, triethylene glycol, glycerol, pyrrolidone, N-methylpyrrolidone, dimethylformamide, sulfolane, and the like. A suitable solvent solution is a Sulfinol solution comprising about 30 to 50 % w alkanolamine, such as diisopropanol amine, or the like, about 10 to about 30 % w sulfolane and the balance water. Stress corrosion cracking of metal weldments is usually related to the alkanol amine strength of the aqueous solutions thereof and is usually the greatest in dilute aqueous solutions containing about 25 % w of alkanol amine. This may be because these aqueous solutions usually have a higher concentration of the kinds of contaminants which result in stress corrosion cracking of metal weldments because these contaminants are generally water soluble. The aqueous alkanol amine solution compositions of the present invention can also contain other conventional additives, such as anti-foam agents, corrosion inhibitors for common general corrosion of metal surfaces and the like known to those skilled in the art.

The above is not meant to be an exhaustive list of alkanol amines and other materials such as co-solvents that can be present with alkanol amines, but is meant to provide a representative illustration of the kinds of alkanol amines and other materials which those of skill in the art would recognize as common representatives of alkanol amines and other materials, and thus would be able to substitute equivalent known in the art for those which applicant has set forth by way of illustration.

In addition to elemental sulfur, a variety of (metal-) sulfide ion yielding compounds can be added to the aqueous alkanol amine solution as the sulfiding agent to reduce or prevent stress corrosion cracking of metal weldments. A sulfide ion yielding compound is a compound which will provide sulfur containing ions in solution capable of forming a protective metal sulfide film with the metals of the equivalent under the process conditions in the $H_2$ free segments of the plant (stripper and lean solvent areas), as well as the rich solvent sectors. These compounds are non-volatile. The added sulfur or sulfide ion yielding compounds of the invention include compounds which will dissolve in the alkanol amine solutions to form such useful compounds by reaction with contaminants in the alkanol amine solution. The useful sulfide ion yielding compounds of the invention include soluble sulfur compounds such as hydrogen, ammonium, (alkali or alkaline earth) metal sulfides, disulfides, and polysulfides, all kinds of soluble thiosulfates, organic disulfides and polysulfides, and equivalent kinds of sulfide ion yielding compounds. Non-limiting examples of the materials which can be added to reduce stress corrosion cracking of metal weldments include ammonium sulfide, disulfide or polysulfide, sodium sulfide, disulfide or polysulfide, calcium sulfide, disulfide or polysulfide, sodium thiosulfate, and organic disulfide and polysulfides containing up to about 20 carbon atoms and which can be aliphatic, cycloaliphatic aryl or (hetero)aryl in nature, such as dimethyl disulfide, phenyl disulfide, sodium thiosulfate and the like. Any sulfide ion yielding compound present in sufficiently high concentration which would accomplish the objectives of obtaining and maintaining a protective metal sulfides film on the equipment is equivalent to those sulfide ion yielding compounds specifically illustrated herein.

The amount of elemental sulfur or sulfide ion yielding compound used in the present invention is an amount sufficient to accomplish the desired result of reducing or eliminating the stress corrosion cracking of metal weldments caused by the contaminated alkanol amine solution composition. The amount of sulfur or sulfide ion yielding compound to be used will vary to some degree with the concentration of the corrosive constituents of the aqueous alkanol amine solution composition and the compound used and is readily determined by simple corrosion testing using conventional test methods known in the art or as described in the illustrative embodiments herein. By way of illustration, when the composition is a conventional aqueous alkanol amine solution for acid gas treating, the sulfur or sulfide ion yielding compound can be used to provide an amount of sulfur or sulfide ion of at least about 0.025 % w sulfur atom equivalent or higher basis the solvent solution, usually excess sulfur or sulfide ion of from about 0.025 % w to about 1.5 % w sulfur atom equivalent based on the total volume of the aqueous alkanol amine solution composition.

Results as first reported herein by the Applicant have shown that the prime failure mode for non-stress relieved carbon steel weldments in alkanol amine solvent hydrogen sulfide/carbon dioxide removal facilities is not fissuring as in carbon dioxide dominated systems but intergranular stress corrosion cracking of the metal weldments. Of particular concern is the presence of a weak concentration of sulfiding agent, such as low concentration of thiosulfate ion or of thiocyanate ion, which are crack promoters in process areas of negligible hydrogen sulfide partial pressure, e.g., regenerator and lean solvent handling equipment. Crack propensities are also highest at higher system temperature, i.e., around 240° F. Such environments, of course, prevail in the stripper section of an acid gas removal plant, where inhibition, therefore, is most critical and aqueous alkanol amine solutions in this area should contain sulfur or sulfide ion yielding compounds to reduce stress corrosion cracking of metal weldments.

Hydrogen sulfide is a good metal surface film former in aqueous alkanol amine systems, but it is virtually absent in the stripper bottom and downstream lean solvent equipment of an acid gas removal facility, which comprise areas operating at the highest system temperature of about 240° F. (downstream of the lean/rich heat exchangers). Non-stress relieved carbon steel welds in this section of the plant have been shown to be particularly vulnerable to stress corrosion cracking attack.

In order to examine the potential for improvement in unsatisfactory situations of such a nature, a series of slow strain rate experiments was outlined for which certain aqueous monoethanol amine test solutions known to be conducive to stress corrosion crack initiation were employed. Water soluble, strong sulfiding agents selected from sulfur or sulfide ion yielding compounds were introduced into these environments to form or stabilize protective metal sulfide surface films in the absence of hydrogen sulfide. Protective metal sulfide films will prevent the initiation of stress corrosion cracking if they are tightly adhering at process condition and if they are resistant to localized breakdown in the presence of chlorides and/or cyanides.

The invention also relates to a process for reducing stress corrosion cracking of metal weldments in the absence of hydrogen sulfide during gas treating with an aqueous alkanol amine gas treating solvent solution which comprises adding to the aqueous alkanol amine solution a stress corrosion cracking inhibiting amount of a sulfiding agent selected from elemental sulfur or a sulfide ion yielding compound.

When the aqueous alkanol amine solution composition is a solvent composition for the treatment of a gas stream or the like, the solvent can be regenerated using conventional techniques known in the art for solvent regeneration, stripping and the like, as long as the regeneration process does not introduce substances which would react with the sulfur or sulfide ion yielding compound under conditions of regeneration to result in the elimination of the useful nature of the sulfur or sulfide ion yielding compound which contributes to the stress corrosion cracking inhibition effects of the present invention unless it is planned to add replacement amounts of sulfur or sulfide ion yielding compound to the regenerated aqueous alkanol amine composition.

Similarly, when the aqueous alkanol amine solution composition of the invention is a reactant or a product aqueous alkanol amine solution, it can be used in an conventional manner known to those of skill in the art as long as the process does not result in the elimination of the useful nature of the elemental sulfur or the character of the sulfide ion yielding compound if it is desired to maintain both the aqueous alkanol amine and the stress corrosion cracking inhibiting effects of the sulfur or sulfur ion yielding compound.

The particular type of gas stream containing hydrogen sulfide or carbon dioxide to be treated with aqueous alkanol amine absorbent solution of the invention is not critical as will be evident to those of skill in the gas treating art. Streams suitable for the removal of hydrogen sulfide or carbon dioxide by the practice of the present invention include naturally occurring gases, synthesis gases, process gases and fuel gases produced by the gasification of coal, petroleum, shale, tar sands and the like, including natural gas, refinery feedstocks, coal gasification streams and other gaseous hydrocarbon streams. The purification of carbon dioxide containing hydrogen sulfide including carbon dioxide in its common or supercritical form is also within the scope of the present invention. The term hydrocarbon stream includes gas streams containing significant quantities of hydrocarbons both paraffinic or aromatic in nature either as relatively uniform stream of a single hydrocarbon, e.g., methane, or as a mixture of various hydrocarbons.

The amount of hydrogen sulfide or carbon dioxide impurity to be removed from the gas stream by treatment with the aqueous alkanol amine solvent composition of the present invention will vary extensively. By way of example, the process works well when the impurities to be removed are present in the gas within the range of from about 0.1 percent to about 10 percent by volume. The presence of higher or lower amounts of acidic gases are not excluded as obviously the amount of hydrogen sulfide or carbon dioxide impurity present in the gas stream is not a limiting factor in the practice of the present invention. Those skilled in the art of gas separation can readily select the specific alkanol amine composition best suited to the particular gas stream they are to purify.

Similarly, the conditions of temperature, pressure, flow rate, contact time and the like can vary with the gas stream to be treated and the aqueous alkanol amine composition to be used. However, the temperature does have an effect on the stress corrosion cracking in the presence of contaminated aqueous alkanol amine solutions as they vary in strength as has been discussed above. Thus, the temperature of the gas treating is any temperature at which conventional aqueous alkanol amine gas treating can be conducted and is well known to those of skill in the art. The pressure is also not critical to the operation of the invention and is any pressure at which conventional aqueous alkanol amine gas treating can be conducted and is well known to those of skill in the art. The pressure can be atmospheric or below or above and is usually above normal atmospheric pressure. By way of illustration, the pressure is from about 10 psig to about 2000 psig and the temperatures are from about 100° F. to about 280° F. The above conditions are provided by way of illustration and can be modified to the specific gas stream and solvent to be utilized and should not be regarded as a limitation of the invention.

Stress corrosion cracking of metal weldments is reduced by incorporating the sulfur or sulfide ion yielding compound into the alkanol amine solution, preferably with sufficient agitation, e.g., stirring, to insure that the sulfur or sulfide ion yielding compound is well dissolved into the aqueous alkanol amine solution. When the aqueous alkanol amine solution is used as a solvent, product, or a reactant, it is of course wise to add the sulfur or sulfide ion yielding compound at the earliest opportunity in which it will not otherwise interfere with the process being conducted. As known to those skilled in the art, numerous devices and arrangements are available for the flowing of gas into and out of contact with the aqueous alkanol amine solvent compositions of the invention. There should be sufficient trays in the equipment of the contacting and regeneration zoned to effect the invention to the fullest degree.

ILLUSTRATIVE EMBODIMENT

The invention is illustrated by the following embodiments, which should not be regarded as limiting it in any way.

Embodiment 1

Carbon steel tensile specimens were strained at rates of about $5 \times 10^{-7}$ sec$^{-1}$, while being exposed to aqueous solutions of the following standard composition:

| | |
|---|---|
| MEA | 25% |
| Carbonate (CO$_3$ ion) | 0.96% |
| Bicarbonate (HCO$_3$ ion) | 0.44% |
| Thiosulfate (S$_2$O$_3$ ion) | 0.21% |
| Chloride (Cl ion) | 0.06% |
| Cyanide (CN ion) | 0.07% |

The experiments were conducted at 240° F. A back pressure of 100 psig carbon dioxide was maintained. Time to failure was relatively short, namely about the 50% of the more ductile "no crack" situations (Exp. 1). Photomicrographs of the failed tensile specimens showed fissuring and deep intergranular cracking.

Attempts to inhibit intergranular stress corrosion cracking of carbon steel in aqueous alkanol amine systems centered around the concept of increasing the sulfiding ability of the environment, i.e., strengthening the sulfide component of the metal surface film. In order to achieve this goal, elemental sulfur, dimethyl disulfide (DMDS) and excess amounts of thiosulfate were added to the 25% MEA solution. Hydrogen sulfide would assume a similar role but, of course, it is removed in the stripper and lean solvent sections of an alkanol amine gas treating plant, where on the other hand, intergranular stress corrosion cracking of carbon steel is most prevalent. Results of comparative slow strain rate tests involving 25% MEA solutions and using two different base compositions (as the sodium salts) are summarized in Table 1. Carbonate/bicarbonate/carbon dioxide levels were standardized at the values of the base case (Exp 1). Results are set forth in Table 1 in which the thiosulfate, chloride and cyanide contaminates in the solution are given as % ion introduced and "sulfur equivalent" refers to sulfur atom equivalent in the material added to reduce stress corrosion cracking.

TABLE 1

INHIBITION OF INTERGRANULAR STRESS CORROSION CRACKING OF CARBON STEEL IN 25% MEA SOLUTIONS

| Exp. No. | Solution Composition | | Time to Failure Hours | Cracking Mode | | |
|---|---|---|---|---|---|---|
| | | | | Intergranular | Transgranular | Fissuring |
| 1 | Thiosulfate | 0.21% | 28 | heavy | none | heavy |
| | Chloride | 0.06% | | | | |
| | Cyanide | 0.07% | | | | |
| 2 | Thiosulfate | 0.21% | 47 | none | none | none |
| | Chloride | 0.06% | | | | |
| | Cyanide | 0.07% | | | | |
| | Sulfur | 0.5% | | | | |
| 3 | Thiosulfate | 0.21% | 44 | none | light mixed mode | medium |
| | Chloride | 0.06% | | | | |
| | Cyanide | 0.07% | | | | |
| | DMDS (Sulfur Equivalent) | 0.5% | | | | |
| 4 | Thiosulfate | 0.21% | 51 | none | none | very light |
| | Chloride | 0.06% | | | | |
| | Cyanide | 0.07% | | | | |
| | DMDS (Sulfur Equivalent) | 1.0% | | | | |
| 5 | Thiosulfate | 0.21% | 41 | none | light | light |
| | Chloride | 0.06% | | | | |
| | Cyanide | 0.07% | | | | |
| | Additional | 0.5% | | | | |

TABLE 1-continued

INHIBITION OF INTERGRANULAR STRESS CORROSION CRACKING OF CARBON STEEL IN 25% MEA SOLUTIONS

| Exp. No. | Solution Composition | | Time to Failure Hours | Cracking Mode | | |
|---|---|---|---|---|---|---|
| | | | | Intergranular | Transgranular | Fissuring |
| | Thiosulfate (Sulfur Equivalent) | | | | | |
| 6 | Thiosulfate | 0.06% | 37 | light | light mixed mode | light |
| | Chloride | 0.06% | | | | |
| | Cyanide | 37 ppm | | | | |
| 7 | Thiosulfate | 0.06% | 45 | none | none | none |
| | Chloride | 0.06% | | | | |
| | Cyanide | 37 ppm | | | | |
| | Sulfur | 0.025% | | | | |
| 8 | Thiosulfate | 0.06% | 50 | none | none | none |
| | Chloride | 0.06% | | | | |
| | Cyanide | 37 ppm | | | | |
| | DMDS (Sulfur Equivalent) | 0.025% | | | | |
| 9 | Thiosulfate | 0.06% | 48 | none | none | none |
| | Chloride | 0.06% | | | | |
| | Cyanide | 37 ppm | | | | |
| | Additional Thiosulfate (Sulfur Equivalent) | 0.025% | | | | |

100 psig carbon dioxide atmosphere
0.96% carbonate, 0.44% bicarbonate
Temperature: 240° F.
Strain Rate: $5 \times 10^{-7} \sec^{-1}$ Effective crack inhibition is achieved when adding to a severely crack inducing amine solution an amount of sulfiding compound which is equivalent to 0.5% sulfur equivalent basis solvent. In order to demonstrate the benefit of such inhibition, the most aggressive intergranular cracking environment (Exp 1) was used as a reference. Elemental sulfur proved to be the most efficient additive (Exp 2). It provides complete crack inhibition at the 0.5% level. Dimethyl disulfide reduces crack activity substantially at the 0.5% equivalent sulfur level (Exp 3), but is completely effective only at the 1.0% equivalent sulfur level (Exp 4). Excess thiosulfate possesses somewhat higher inhibitive properties than dimethyl disulfide, but somewhat lower ones than elemental sulfur (Exp 5).

In order to also demonstrate the beneficial effects of sulfur containing additives in a less severe environment, the amine solution composition of Exp 6 was used as a reference electrolyte. In this situation, addition of compounds, whose sulfur constituents establish a 0.025% sulfur equivalent level in solution, provides complete crack inhibition. Experiments 7, 8 and 9.

In conclusion, the test series listed in Table 1 demonstrate that stress corrosion cracking of carbon steel exposed to alkanol amine solutions contaminated with carbonates, small amounts of a weak sulfiding agent plus chloride and cyanide in the presence of atmospheric carbon dioxide is inhibited by the addition of strong sulfiding agents of the invention to the system.

Embodiment 2

It is desirable to establish maximum tolerable contamination levels. Consequently, departing from the base case (Exp 1, Table 1), minimum concentrations of chloride and cyanide in solution, required to produce intergranular stress corrosion cracking, were explored. Slow strain rate test results are summarized in Table 2. Again, all experiments were conducted in 25% aqueous MEA solutions at constant carbonate/bicarbonate/carbon dioxide levels and at a temperature of 240° F. as set forth in Embodiment 1. The results are set forth in Table 2 in which the thiosulfate, chloride and cyanide contaminates in the solution are given as % ion introduced and "sulfur equivalent" refers to sulfur atom equivalent in the material added to reduce stress corrosion cracking.

TABLE 2

DETERMINATION OF HIGHEST TOLERABLE CONTAMINANT LEVELS IN 25% MEA SOLUTIONS

| Exp. No. | Solution Composition | | Time To Failure Hours | Cracking Mode | | |
|---|---|---|---|---|---|---|
| | | | | Intergranular | Transgranular | Fissuring |
| 1 | Thiosulfate | 0.21% | 28 | heavy | none | heavy |
| | Chloride | 0.06% | | | | |
| | Cyanide | 0.07% | | | | |
| 10 | Thiosulfate | 0.21% | 39 | light | heavy | heavy |
| | Chloride | none | | | | |
| | Cyanide | 0.07% | | | | |
| 11 | Thiosulfate | 0.06% | 24 | heavy | none | medium |
| | Chloride | none | | | | |
| | Cyanide | 0.07% | | | | |
| 3 | Thiosulfate | 0.06% | 30 | medium | none | heavy |
| | Chloride | 0.06% | | | | |

TABLE 2-continued
DETERMINATION OF HIGHEST TOLERABLE CONTAMINANT LEVELS IN 25% MEA SOLUTIONS

| Exp. No. | Solution Composition | | Time To Failure Hours | Cracking Mode | | |
|---|---|---|---|---|---|---|
| | | | | Intergranular | Transgranular | Fissuring |
| 12 | Cyanide | 0.07% | 38 | light | light mixed mode | medium |
| | Thiosulfate | 0.06% | | | | |
| | Chloride | 0.06% | | | | |
| 6 | Cyanide | 74 ppm | 37 | light | light mixed mode | light/ medium |
| | Thiosulfate | 0.06% | | | | |
| | Chloride | 0.06% | | | | |
| 14 | Cyanide | 37 ppm | 53 | very light | none | very light |
| | Thiosulfate | 0.06% | | | | |
| | Chloride | 0.06% | | | | |
| 15 | Cyanide | none | 39 | light | none | light |
| | Thiosulfate | 0.03% | | | | |
| | Chloride | 0.03% | | | | |
| 16 | Cyanide | none | 54 | none | none | none |
| | Thiosulfate | 0.03% | | | | |
| | Chloride | none | | | | |
| 17 | Cyanide | none | 50 | none | none | none |
| | Thiosulfate | 0.03% | | | | |
| | Chloride | 30 ppm | | | | |
| | Cyanide | 30 ppm | | | | |

100 psig carbon dioxide atmosphere
0.96% carbonate, 0.44% bicarbonate
Temperature: 240° F.
Strain Rate: $5 \times 10^{-7} \text{sec}^{-1}$ In the absence of chloride, but presence of cyanide and a relatively high level of thiosulfate (0.21%), heavy transgranular cracking predominates (Exp 10). Decreasing the theiosulfate concentration to 0.06%, but leaving the other parameters unchanged, reverts the cracking mode to intergranular (Exp 11).

Starting from a somewhat different base case than the experiment 1 example, namely a solution containing 0.06% thiosulfate, 0.06% chloride plus 0.07% cyanide (Exp 3), and decreasing the cyanide concentration to 74 ppm, 37 ppm and ultimately zero (Exps 12, 13 and 14), definitely shows decreasing intergranular crack propensity with some residual activity left, however, even in the total absence of cyanide (Exp 14). In fact, the crack intensity is increased again at reduce thiosulfate/chloride levels (to 0.03% each, Exp 15).

Experiment 15 further stresses the complicated role of chloride ions in alkanol amine systems. Since experiment 16 confirms that thiosulfate by itself, i.e., in the absence of both chloride and cyanide, does not promote cracking even at the reduced level of 0.03%, it must be assumed that the influence of chlorides varies in a complex way with the amount of thiosulfate (or probably any other weak concentration of sulfiding agent) present in the system.

The concluding experiment 17 suggests that intergranular stress corrosion cracking of carbon steel in 25% MEA solutions may be expected to occur at the 0.03% thiosulfate level (or an equivalent concentration of another weak sulfiding agent), if either chloride or cyanide contamination exceeds 30 ppm.

Embodiment 3

Another base case for an environment conducive to initiation of severe intergranular stress corrosion cracking in non-stress relieved carbon steel welds was provided by an aqueous monoethanolamine (MEA) solution of the following composition:

| Monoethanolamine (MEA) | 25% |
|---|---|
| Carbonate ions (CO₃) | 0.96% |

-continued

| Bicarbonate ions (HCO₃) | 0.44% |
|---|---|
| Thiocyanate ions (SCN) | 0.2% |
| Chloride ions (Cl) | 0.1% |

This solution was saturated with carbon dioxide at room temperature, and then heated to the test run temperature of 240° F., while a system pressure of about 100 psig was maintained. Exposure of a tensile specimen during this slow strain rate test to the above solution showed characteristic cracks of the intergranular type. Exposure of a 50% monoethanol amine solution containing the impurities listed above led to primarily transgranular cracking.

The following additions of sulfur containing compounds to these two monoethanol amine solutions were evaluated:

(a) 1% sulfur in the form of sodium thiosulfate. In the 25% MEA solution, many very small transgranular (2 grain size deep) cracks formed. In the 50% MEA solution, some short fissures were in evidence.

(b) 1% elemental sulfur and a gas phase consisting of 50 psig carbon dioxide and 150 psig hydrogen sulfide. In the 25% MEA, no cracking occurred. In the 50% MEA solution, only very small fissures in the necked-down area developed.

Results of these experiments demonstrate that elemental sulfur reduces stress corrosion cracking of metal welds by contaminated aqueous alkanol amine solutions.

Embodiment 4

Aqueous alkanol amine solutions used to remove carbon dioxide in the absence of hydrogen sulfide are also amenable to inhibition by strong concentrations of water soluble sulfur compounds, such as thiosulfates because interaction of this sulfiding agent with metal surfaces form and maintain a tightly adhering sulfidic surface film in the absence of hydrogen sulfide. The slow strain rate test method was used to test aqueous monoethanol amine (MEA) solutions containing only 1% carbonate ion, 0.44% bicarbonate ion and 0.1% chloride ion. The aqueous monoethanol amine solution were again saturated with carbon dioxide at room temperature and then heated to the test run temperature of 240° F., while a system pressure of 100 psig was maintained. The decay mechanism of carbon steel weld exposure to environments containing the above described contaminants is heavy fissuring with mixed mode components in both a 25% MEA and a 50% MEA solution. Addition of 1% sulfur equivalent in the form of sodium thiosulfate ions reduced the cracking to very light short fissuring.

Results of these experiments demonstrate that in the absence of hydrogen sulfide as in the treating of a carbon dioxide containing gas stream free of hydrogen sulfide with an aqueous alkanol amine solution, strong concentrations of water soluble sulfide ion yielding compounds reduce stress corrosion cracking of metal welds.

The invention has not been illustrated with any particular kind of apparatus as those skilled in the art of gas separation and other means of aqueous alkanol amine utilization will appreciate that many variations in equivalent or analogous zones, reactors or units can be employed. There should be sufficient trays in the contacting zones of a gas treating process for the gas to be effectively purified by a process using an aqueous alkanol amine solvent composition according to the invention. The equipment to be employed includes, where suitable, the use of segmented equipment operated in series or the division of one unit into multiple units and the like. Parallel operation of units is also within the scope of the present invention.

What is claimed is:

1. A process for reducing stress corrosion cracking of metal weldments in the presence of an aqueous alkanol amine solution which consists of adding to the aqueous alkanol amine solution an effective amount of a stress corrosion cracking inhibitor consisting of a sulfiding agent selected from elemental sulfur or sulfide ion yielding compound.

2. A process according to claim 1 wherein the alkanol amine is a primary or secondary alkanol amine.

3. A process according to claim 1 wherein the alkanol amine is methyldiethanol amine, monoethanol amine or diethanol amine.

4. A process according to claim 1 wherein the alkanol amine or aqueous alkanol amine solution is used as a solvent solution containing a co-solvent.

5. A process according to claim 4 wherein the co-solvent is alkane diol, alkane polyol, ether, sulfoxide, sulfone, N-heterocyclic or carboxylic acid amide.

6. A process according to claim 5 wherein the co-solvent is sulfolane.

7. A process according to claim 6 wherein the solvent solution comprises a mixture of sulfolane, diisopropanol amine, methyldiethanol amine, monoethanol amine or diethanol amine and water.

8. A process according to claim 1 wherein elemental sulfur or a water-soluble thiosulfate is used.

9. A process according to claim 3 wherein elemental sulfur is used.

10. A process for reducing stress corrosion cracking of metal weldments in the absence of hydrogen sulfide during gas treating with an aqueous alkanol amine gas treating solvent solution which consists of adding to the aqueous alkanol amine solution an effective amount of a stress corrosion inhibitor consisting of a sulfiding agent selected from elemental sulfur or a sulfide ion yielding compound.

11. A process according to claim 10 wherein the alkanol amine is a primary of secondary alkanolamine.

12. A process according to claim 10 wherein the alkanol amine is methyldiethanol amine, monoethanol amine or diethanol amine.

13. A process according to claim 10 wherein the alkanol amine or aqueous alkanol amine solution is used as a solvent solution containing a co-solvent.

14. A process according to claim 13 wherein the co-solvent is alkane diol, alkane polyol, ether, sulfoxide, sulfone, N-heterocyclic or carboxylic acid amide.

15. A process according to claim 14 wherein the co-solvent is an sulfolane.

16. A process according to claim 15 wherein the solvent solution comprises a mixture of sulfolane; diisopropanol amine, methyldiethanol amine, monoethanol amine or diethanol amine and water.

17. A process according to claim 10 wherein elemental sulfur or a water-soluble thiosulfate is used.

18. A process according to claim 17 wherein elemental sulfur is used.

* * * * *